United States Patent
Hong et al.

(10) Patent No.: US 12,127,058 B2
(45) Date of Patent: Oct. 22, 2024

(54) METHOD FOR PERFORMING COMMUNICATION BY USING NON-TERRESTRIAL NETWORK, AND APPARATUS THEREFOR

(71) Applicant: KT CORPORATION, Gyeonggi-do (KR)

(72) Inventors: Sung-Pyo Hong, Seoul (KR); Ki-tae Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 418 days.

(21) Appl. No.: 17/420,994

(22) PCT Filed: Dec. 30, 2019

(86) PCT No.: PCT/KR2019/018690
§ 371 (c)(1),
(2) Date: Jul. 6, 2021

(87) PCT Pub. No.: WO2020/145558
PCT Pub. Date: Jul. 16, 2020

(65) Prior Publication Data
US 2022/0086715 A1    Mar. 17, 2022

(30) Foreign Application Priority Data

Jan. 7, 2019 (KR) .................. 10-2019-0001945
Dec. 26, 2019 (KR) .................. 10-2019-0174887

(51) Int. Cl.
*H04W 36/06* (2009.01)
*H04W 36/00* (2009.01)
(Continued)

(52) U.S. Cl.
CPC ....... *H04W 36/06* (2013.01); *H04W 36/0085* (2018.08); *H04W 36/24* (2013.01); *H04W 74/0833* (2013.01)

(58) Field of Classification Search
CPC .... H04B 7/0695; H04B 7/088; H04B 7/2041; H04W 36/0085; H04W 36/06;
(Continued)

(56) References Cited

U.S. PATENT DOCUMENTS

2021/0119698 A1* 4/2021 Atungsiri ........... H04B 7/18541
2021/0144612 A1* 5/2021 Wei ....................... H04W 16/28
(Continued)

FOREIGN PATENT DOCUMENTS

WO    2016/130062 A1    8/2016

OTHER PUBLICATIONS

ZTE Corporation et al., "Consideration on the cell definition and NTN mobility", R2-1817062, 3GPP TSG-RAN WG2 Meeting#104, Spokane, USA, Nov. 12-16, 2018.
(Continued)

*Primary Examiner* — Awet Haile
(74) *Attorney, Agent, or Firm* — IP Legal Services, LLC

(57) ABSTRACT

Disclosed is a terminal and a base station for communicating each other by using a non-terrestrial network (NTN). A method of a terminal may include the steps of receiving, from a base station, configuration information for cell changing or beam failure recovery, determining, by using the configuration information, whether a trigger condition for cell changing or beam failure recovery is satisfied, and performing a cell changing or beam failure recovery operation when the trigger condition is satisfied; and an apparatus.

11 Claims, 18 Drawing Sheets

(51) Int. Cl.
*H04W 36/24* (2009.01)
*H04W 74/08* (2024.01)
*H04W 74/0833* (2024.01)

(58) Field of Classification Search
CPC .............. H04W 36/24; H04W 36/305; H04W 74/0833; H04W 76/19
See application file for complete search history.

(56) References Cited

U.S. PATENT DOCUMENTS

| | | | |
|---|---|---|---|
| 2021/0235336 A1* | 7/2021 | Martin | H04W 36/0061 |
| 2021/0258844 A1* | 8/2021 | Kim | H04W 36/0058 |
| 2021/0329518 A1* | 10/2021 | Sharma | H04B 7/18504 |

OTHER PUBLICATIONS

Fraunhofer Iis et al., "NR-NTN: Tracking Areas Management", R2-1818593, 3GPP TSG-RAN WG2 Meeting #104, Spokane, USA, Nov. 12-16, 2018, pp. 1-8.

Hughes, "NR-NTN: Paging in NGSO Satellite Systems", R3-184403, 3GPP TSG RAN WG3 Meeting #101, Gothernburg, Sweden Aug. 20-24, 2018, pp. 1-5.

Ericsson, "On adapting random access procedures for NTN", R1-1811329, 3GPP TSG-RAN WG1 Meeting #94bis, Chengdu, China, Oct. 8-12, 2018, pp. 1-3.

* cited by examiner

FIG.10

| Platforms | Altitude range | Orbit | Typical beam footprint size |
|---|---|---|---|
| Low-Earth Orbit (LEO) satellite | 300 - 1500 km | Circular around the earth | 100 - 500 km |
| Medium-Earth Orbit (MEO) satellite | 7000 - 25000 km | | 100 - 500 km |
| Geostationary Earth Orbit (GEO) satellite | 35 786 km | notional station keeping position fixed in terms of elevation/azimuth with respect to a given earth point | 200 - 1000 km |
| UAS platform (including HAPS) | 8 - 50 km (20 km for HAPS) | | 5 - 200 km |
| High Elliptical Orbit (HEO) satellite | 400 - 50000 km | Elliptical around the earth | 200 - 1000 km |

FIG.14

| Epoch (day, hr, min, sec) | X[km] | Y[km] | Z[km] | dX/dt[km/s] | dY/dt[km/s] | dZ/dt[km/s] |
|---|---|---|---|---|---|---|
| 2018-12-26 02:00:00 | 19151.529 | -37578.251 | 17.682 | -0.00151 | -0.00102 | -0.00106 |
| 2018-12-26 02:05:00 | 19151.1073 | -37578.556 | 17.359 | -0.00152 | -0.00101 | -0.00109 |
| 2018-12-26 02:10:00 | 19150.614 | -37578.855 | 17.029 | -0.00154 | -0.00099 | -0.00112 |
| 2018-12-26 02:15:00 | 19150.150 | -37579.151 | 16.690 | -0.00155 | -0.00098 | -0.00114 |

FIG.15

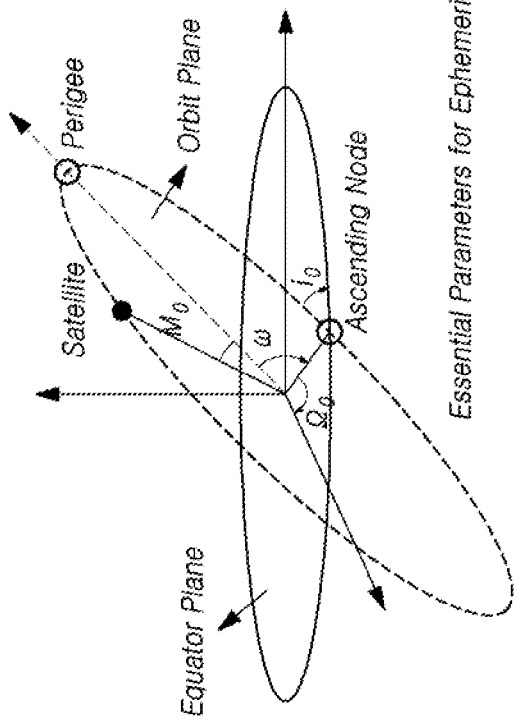

| | | Essential Parameters for Ephemeris | |
|---|---|---|---|
| Orbital plane parameters | $\sqrt{a}$ | Square root of semi major axis | (semi-major axis) |
| | $e$ | Eccentricity | (eccentricity) |
| | $i_0$ | Inclination angle at reference time | (inclination) |
| | $\Omega_0$ | Longitude of ascending node of orbit plane | (right ascension of the ascending node) |
| | $\omega$ | Argument of perigee | (argument of periapsis) |
| Satellite level parameters | $M_0$ | Mean anomaly at reference time | (true anomaly and a reference point in time) |
| | $t_{0e}$ | Ephemeris reference time | (the epoch) | ns

METHOD FOR PERFORMING COMMUNICATION BY USING NON-TERRESTRIAL NETWORK, AND APPARATUS THEREFOR

CROSS REFERENCE TO RELATED APPLICATIONS

This application is a National Stage Patent Application of PCT International Patent Application No. PCT/KR2019/018690 (filed on Dec. 30, 2019) under 35 U.S.C. § 371, which claims priority to Korean Patent Application Nos. 10-2019-0001945 (filed on Jan. 7, 2019) and 10-2019-0174887 (filed on Dec. 26, 2019), the teachings of which are incorporated herein in their entireties by reference.

TECHNICAL FIELD

The disclosure relates to techniques for performing communication using a non-terrestrial network between a user equipment (UE) and a base station.

BACKGROUND ART

The amount of data transmission and reception using wireless communication technology is increasing rapidly according to the increase in the spread of cellular phones and the like, and various types of wireless communication devices are introduced. In addition, as the importance of low latency is highlighted, development of a next-generation wireless communication technology (New RAT) after LTE technology is in progress.

In addition, the number of terminals (e.g., UEs) performing communication using the wireless communication technology is increasing abruptly, and there is a large demand for communication in various environments and locations. In this situation, it is necessary to provide a communication service with a further wider coverage and even in an environment where a base station connected by wire may not be established.

To this end, many researches have been conducted on non-terrestrial networks that are wirelessly linked to core networks in the air, not base stations built on the ground. The non-terrestrial network refers to a network or segment of a network that uses airborne vehicles such as HAPS (High Altitude Platform) or spaceborne vehicles such as satellites for transmission.

In addition, in next-generation wireless communication technology, a beam-related technology is introduced and applied in order to provide a more efficient communication service to a terminal.

However, since the distance between the terminal and the base station (network nodes such as satellites) is very long in a non-terrestrial network, it is required to define a separate protocol for beam recovery and cell change, which is different from a typical protocol for a terrestrial base station, in order to apply the beam-related technology.

DETAILED DESCRIPTION OF THE INVENTION

Technical Problem

The embodiments provide a method and an apparatus to perform communication using a non-terrestrial network between a user equipment (UE) and a base station.

Technical Solution

According to an embodiment of the disclosure, a method may be provided for performing communication using a non-terrestrial network by the user equipment (UE). The method may include receiving configuration information for a cell change or a beam failure recovery from a base station, determining whether a trigger condition for the cell change or the beam failure recovery is satisfied using the configuration information, and performing the cell change or the beam failure recovery operation when the trigger condition is satisfied.

According to an embodiment of the disclosure, a method may be provided for performing communication using a non-terrestrial network by a base station. The method may include transmitting configuration information for a cell change or a beam failure recovery to a user equipment (UE), and performing a random access operation determining when a trigger condition for the cell change or the beam failure recovery is satisfied. The UE may determine whether a trigger condition for the cell change or the beam failure recovery is satisfied using the configuration information.

According to an embodiment of the disclosure, a UE may be provided for performing communication using a non-terrestrial network. The UE may include a receiver configured to receive configuration information for a cell change or a beam failure recovery from a base station, and a controller configured to determine whether a trigger condition for the cell change or the beam failure recovery is satisfied using the configuration information, and perform the cell change or the beam failure recovery operation when the trigger condition is satisfied.

According to an embodiment of the disclosure, a base station may be provided for performing communication using a non-terrestrial network. The base station may include a transmitter configured to transmit configuration information for a cell change or a beam failure recovery to a user equipment (UE), and a controller configured to perform a random access operation determining when a trigger condition for the cell change or the beam failure recovery is satisfied. The UE may determine whether a trigger condition for the cell change or the beam failure recovery is satisfied using the configuration information.

Advantageous Effects

The embodiments may provide the method and the apparatus to perform communication using a non-terrestrial network between a user equipment (UE) and a base station.

BRIEF DESCRIPTION OF DRAWINGS

FIG. 10 is a table showing types of NTN platform.

FIG. 14 is illustrates satellite orbit information according to an embodiment.

FIG. 15 is illustrates a parameter value of satellite orbit information according to an embodiment.

MODE FOR CARRYING OUT THE INVENTION

Figure 1:
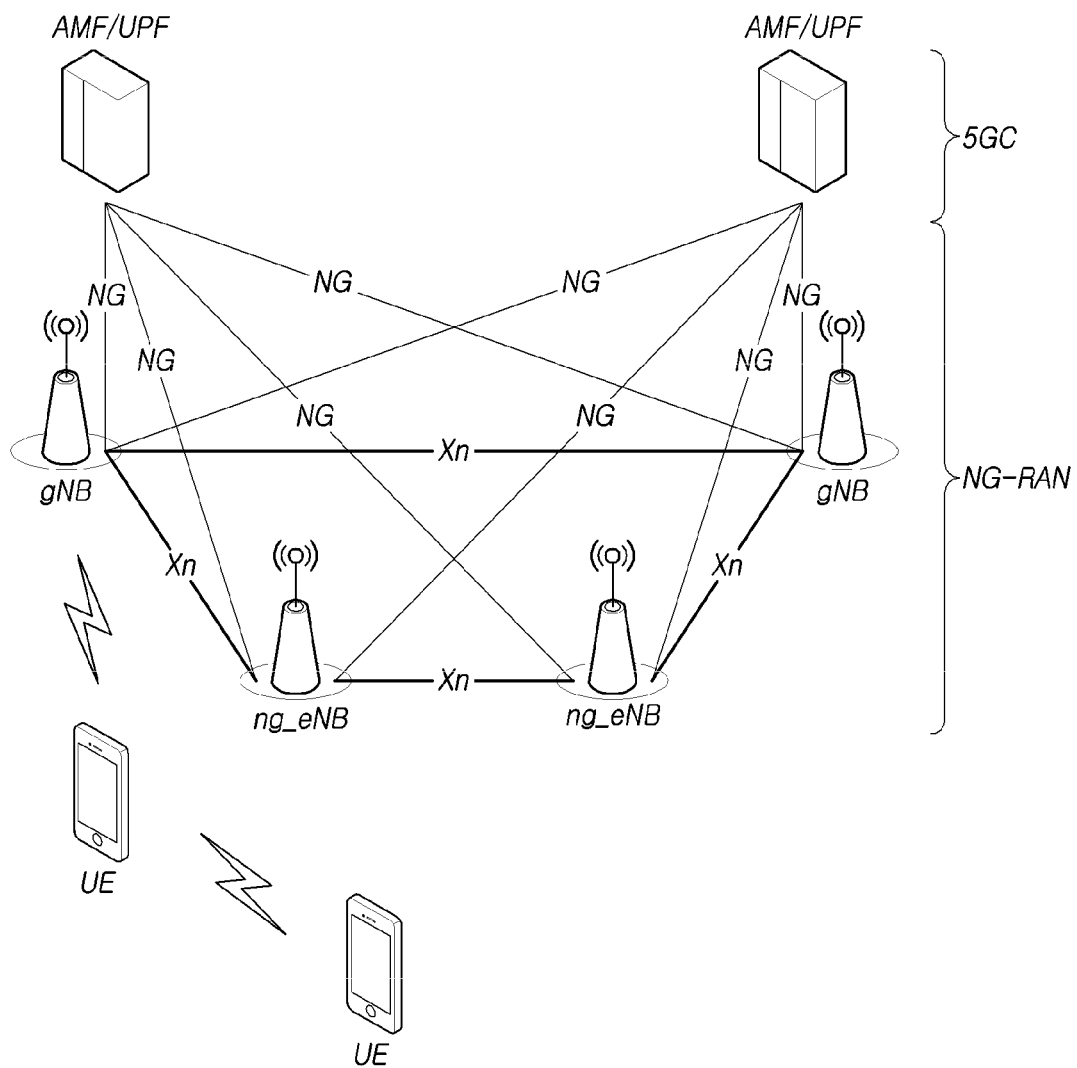
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or the UE may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology.

Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. The OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
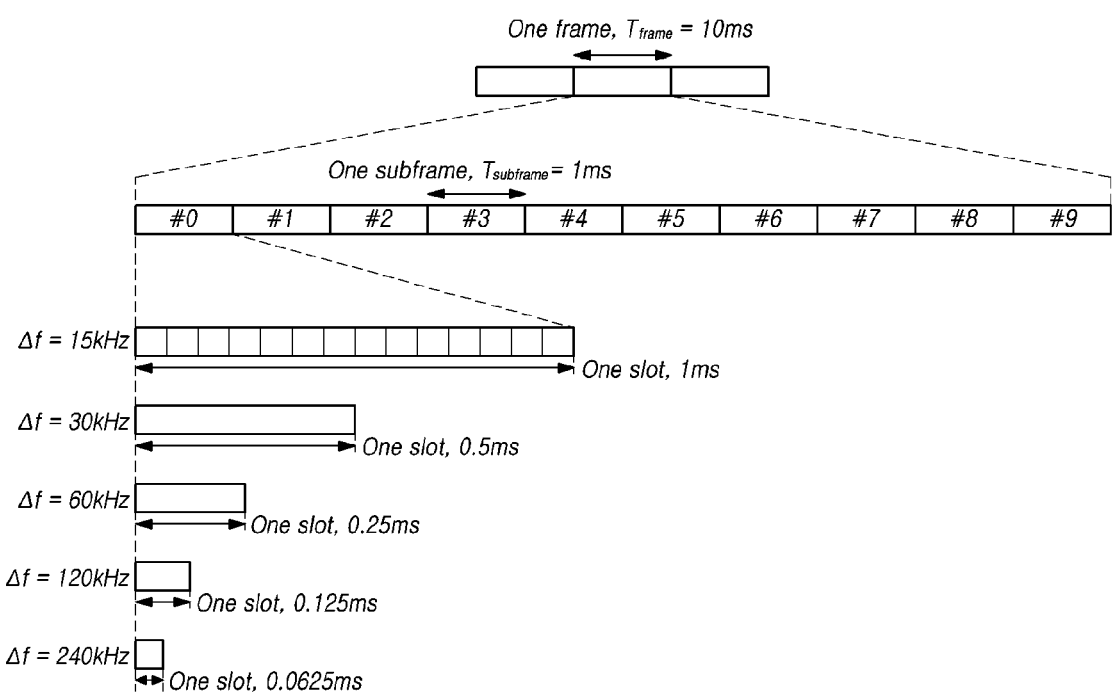
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system.

Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing.

NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by indicating, using the SFI, the index of a table configured through UE-specific RRC signaling. Further, the base station may dynamically indicate the slot format through downlink control information (DCI) or may statically or quasi-statically indicate the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
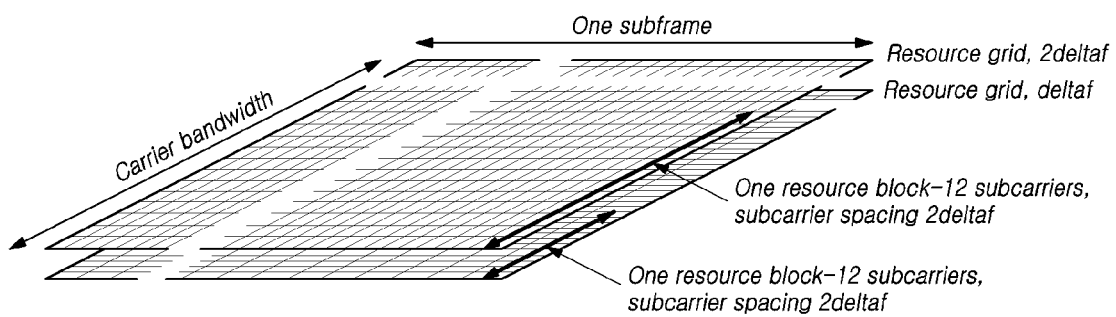
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
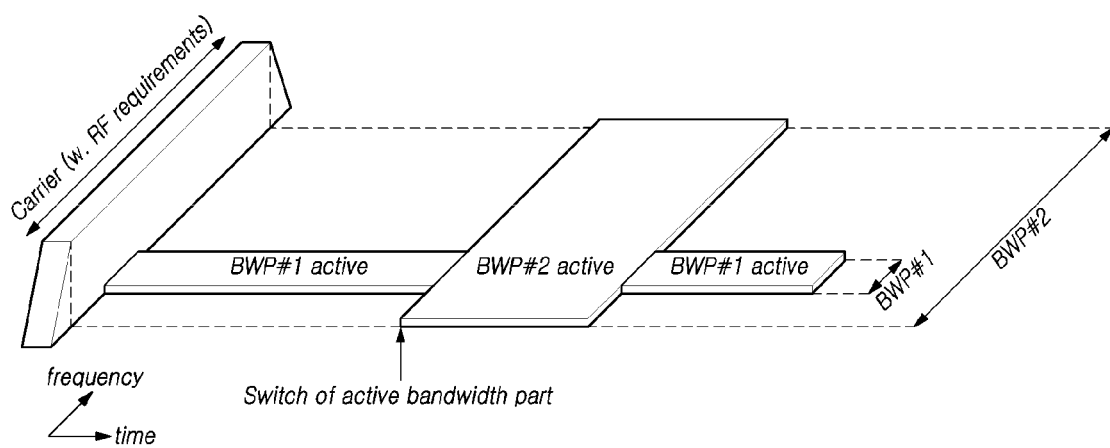
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
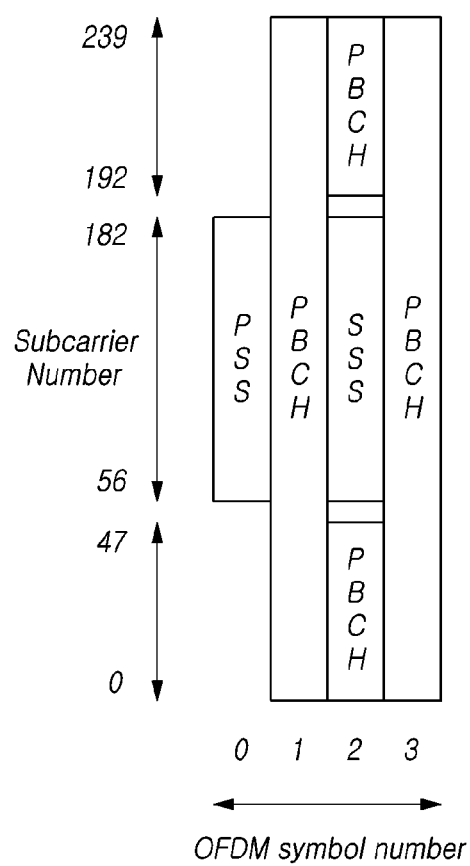
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORE-SET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
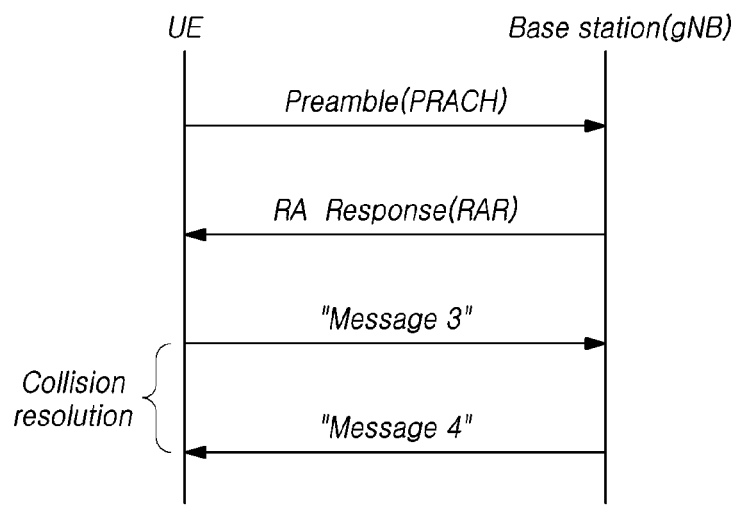
FIG. 6 is a signal diagram for explaining a random access procedure in a radio access technology in accordance with embodiments of the disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
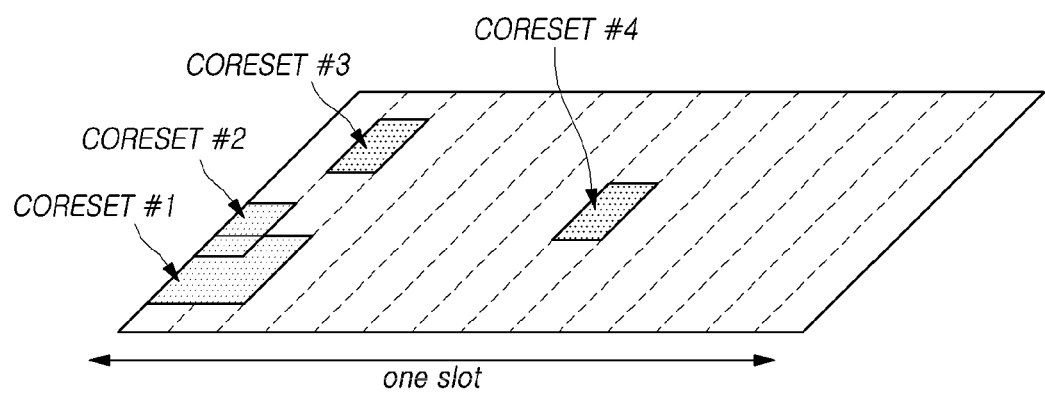
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., indicated, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

3GPP introduced NR, a next-generation wireless communication technology. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of NR supports a frame structure based on multiple subcarriers. The basic subcarrier spacing (SCS) is 15 kHz, and a total of 5 SCS types are supported at 15 kHz*2^n.

Figure 8:
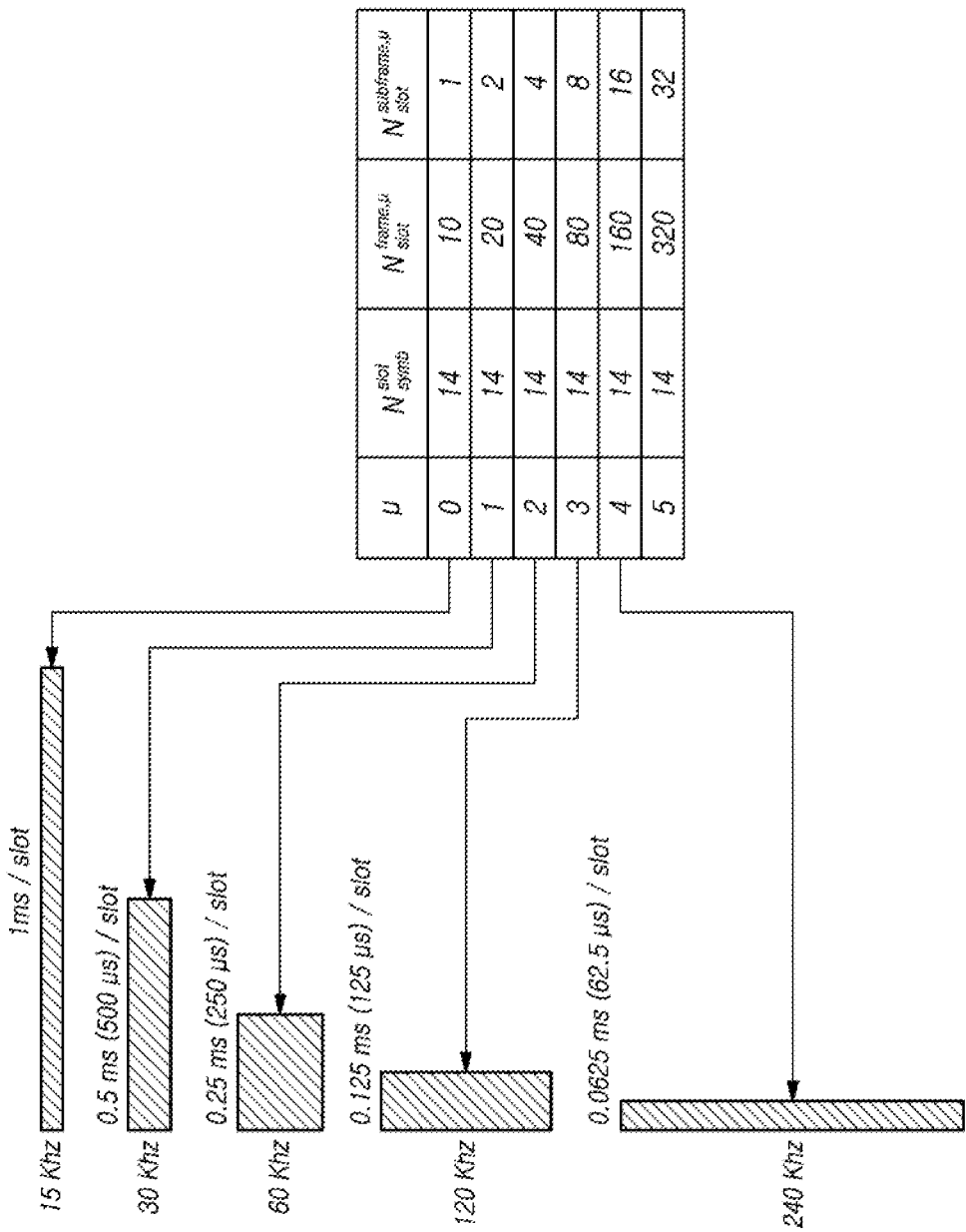
FIG. 8 is a view illustrating different subcarrier spacings arranged at a symbol level.

FIG. 8 is a view illustrating different subcarrier spacings arranged at a symbol level.

As shown in FIG. 8, the length of the time axis of the slot varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/downlink data transmission/reception may be configured via slot aggregation. In particular, in the case of transmission and reception of latency-sensitive data, such as URLLC, it is difficult to satisfy the latency requirements if scheduling is performed in slot units which are based on 1 ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

In NR, the following structure is supported on the time axis. Unlike LTE, the basic scheduling unit is changed to the above described slot in NR. Also, regardless of the subcarrier spacing, a slot made up of 14 OFDM symbols. On the other hand, it supports a non-slot structure (mini-slot structure) composed of 2, 4, and 7 OFDM symbols, which are smaller scheduling units. The non-slot structure may be used as a scheduling unit for URLLC service.

Radio frame: Fixed 10 ms regardless of the numerology.

Subframe: Fixed 1 ms as a reference for time duration. It is not used for data/control scheduling unit, different from the LTE.

Slot: Mainly used for eMBB. It includes 14 OFDM symbols.

Non-slot (i.e. mini-slot): Mainly used for URLLC, but not limited to URLLC only. It includes 2, 4, or 7 OFDM symbols.

One TTI duration: A Time duration for data/control channel transmission. A number of OFDM symbols per a slot/non-slot in the time main.

<NR MIMO and Beam Management>

NR includes a beam management-related technology, an analog beamforming evolution technology and develops a MIMO codebook/feedback technology included in a digital beamforming technology.

The analog beamforming may be broadly classified into i) a beam management-related technology for forming an optimal beam pair between a base station and a UE through a base station/UE beam sweeping transmission and beam repetition transmission and ii) a beam failure recovery technique for forming a new beam pair.

Initial Beam Establishment

An initial beam establishment is a procedure for initially forming the optimal beam pair between the base station and the UE. Such an initial beam establishment is performed in an initial access procedure. During the initial cell search, the UE may acquire some of the plurality of SSBs each configured with different downlink beams transmitted from the base station in time order.

The UE selects an optimal beam based on the acquired SSBs and transmits a random access preamble associated with the optimal beam to the base station. Specifically, different SSB time indices are associated with different random access channel time/frequency occasions (RACH time/frequency occasions) and/or other preamble sequences.

When one SSB is associated with two or more random access time/frequency occasions, frequency is the highest priority, time is next in one slot, and time between two slots have the priority.

Accordingly, the base station may identify the optimal beam through the random access preamble associated with the optimal beam. As a result, the base station and the UE form the initial optimal beam pair.

Beam Adjustment

Since relatively wide beams are used in the initial beamforming, the base station and the UE perform beam adjustment to a relatively narrow beam after the initial beamforming. In addition, the beam adjustment is performed even when movement or rotation of the UE occurs.

The beam adjustment may be divided into downlink beam adjustment and uplink beam adjustment.

The downlink beam adjustment may be divided into downlink transmitter-side beam adjustment and downlink receiver-side beam adjustment.

For example, the downlink transmission-side beam adjustment will be described as an example. When the base station transmits two or more downlink signals (e.g., CSI- RS or SSB), the UE measures them and reports the results to the base station. The base station determines the optimal beam according to a report result from the UE, and the base station and the UE form the beam pair based on the optimal beam.

When the base station and the UE form the beam pair using the CSI-RS, the base station sequentially transmits two or more and up to four CSI-RSs each configured with different beams to the UE. The UE measures each CSI-RS, for example, L1-RSRP, and reports the result to the base station. The report result may include up to four CSI-RS indication information, measured L1-RSRP (measured L1-RSRP for the strong beam) of the strongest beam, the difference values between L1-RSRP of the remaining beams and L1-RSRP of the strongest beam.

Beam Indication and TCI

NR supports a beam indication function. For example, the base station notifies the UE of beams used in the PDSCH and the PDCCH using configuration information and a transmission configuration indicator (TCI).

For example, the UE may be configured with up to 64 candidate TCI states. For PDCCH beam indication, a subset of M configured candidate TCI states is allocated by the higher layer signaling, for example, RRC signaling, and the base station dynamically informs a specific TCI state by MAC signaling.

For PDSCH beam indication, when the PDCCH-PDSCH timing offset or scheduling offset included in the PDCCH is greater than N symbols, the scheduling assignment DCI (e.g., 3 bits) explicitly indicates the TCI state for PDSCH transmission. When the PDCCH-PDSCH timing offset or scheduling offset included in the PDCCH is equal to or smaller than N symbols, the UE assumes that the TCI state of the PDCCH indicated by the MAC signaling and the TCI state for PDSCH transmission are the same as described above.

NR Beam Recovery Procedure

NR supports beam failure detection and recovery procedures. Beam failure is detected by counting beam failure instances from the lower layer to the MAC entity. Beam failure recovery is used to indicate, to the serving gNB, a new SSB or CSI-RS when the beam failure is detected on the serving SSB/CSI-RS.

The RRC may configure one or more of the following parameters in the beam failure recovery configuration information (BeamFailureRecoveryConfig) and the radio link monitoring configuration information (RadioLinkMonitoringConfig) for beam failure detection and recovery.

beamFailureInstanceMaxCount for the beam failure detection;
   beamFailureDetectionTimer for the beam failure detection;
   beamFailureRecoveryTimer for the beam failure recovery procedure;
   rsrp-ThresholdSSB: an RSRP threshold for the beam failure recovery;
   powerRampingStep: powerRampingStep for the beam failure recovery;
   powerRampingStepHighPriority: powerRampingStepHighPriority for the beam failure recovery;
   preambleReceivedTargetPower: preambleReceivedTargetPower for the beam failure recovery;
   preambleTransMax: preambleTransMax for the beam failure recovery;
   scalingFactorBI: scalingFactorBI for the beam failure recovery;
   ssb-perRACH-Occasion: ssb-perRACH-Occasion for the beam failure recovery;
     ra-ResponseWindow: the time window to monitor response(s) for the beam failure recovery using contention-free Random Access Preamble;
   prach-ConfigurationIndex: prach-ConfigurationIndex for the beam failure recovery;
   ra-ssb-OccasionMaskIndex: ra-ssb-OccasionMaskIndex for the beam failure recovery;
   ra-OccasionList: ra-OccasionList for the beam failure recovery.

The operation of the MAC entity for the beam recovery will be described below.

1> If the beam failure instance indication has been received from the lower layer,
2> Start or restart the beam failure detection timer (beamFailureDetectionTime);
2> Increase BFI_COUNTER by 1:
2> If a counter (BFI_COUNTER) for indicating the beam failure instance is greater than or equal to beamFailureInstanceMaxCount;
3> If the beam failure recovery configuration information is configured for the active UL BWP:
4> If configured, start the beam failure recovery timer ((beam FailureRecoveryTimer)).
4> The random access procedure is initiated on the special cell by applying the parameters configured in the beam failure recovery configuration information.
3> Otherwise:
4> Initiate the random access procedure on the special cell.

(The MAC entity shall:
1> if beam failure instance indication has been received from lower layers:
2> start or restart the beamFailureDetectionTimer;
2> increment BFI_COUNTER by 1;
2> if BFI_COUNTER>=beamFailureInstanceMaxCount:
3> if beamFailureRecoveryConfig is configured for the active UL BWP:
4> start the beamFailureRecoveryTimer, if configured;
4> initiate a Random Access procedure on the SpCell by applying the parameters powerRampingStep, preambleReceivedTargetPower, and preambleTransMax configured in beamFailureRecoveryConfig.
3> else:
4> initiate a Random Access procedure on the SpCell.
1> if the beamFailureDetectionTimer expires; or
1> if beamFailureDetectionTimer, beamFailureInstanceMaxCount, or any of the reference signals used for beam failure detection is reconfigured by upper layers:
2> set BFI_COUNTER to 0.
1> if the Random Access procedure is successfully completed:
2> set BFI_COUNTER to 0;
2> stop the beamFailureRecoveryTimer, if configured;
2> consider the Beam Failure Recovery procedure successfully completed.)

Non-Terrestrial Network

The non-terrestrial network refers to a network or segment of a network that uses airborne vehicles such as HAPS (High Altitude Platform) or spaceborne vehicles such as satellites for transmission.

Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).

Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

3GPP developed and introduced a technology that supports NR operation in the non-terrestrial network using the aforementioned satellite or air transport vehicle. However, in the non-terrestrial network, the distance between a base station and a UE is longer than that of a terrestrial network using a terrestrial base station. Accordingly, a very large round trip delay (RTD) may occur. For example, in an NTN scenario using GEO located at an altitude of 35,768 km, the RTD is known to be 544.751 ms, and in an NTN scenario using HAPS located at an altitude of 229 km, the RTD is known to be 3.053 ms. In addition, the RTD in the NTN scenario using the LEO satellite system may appear up to 25.76 ms. As described above, in order to perform a communication operation to which the NR protocol is applied in the non-terrestrial network, there is a demand of a technology for supporting the base station and the UE to perform the NR operation even under such propagation delay.

Figure 9:
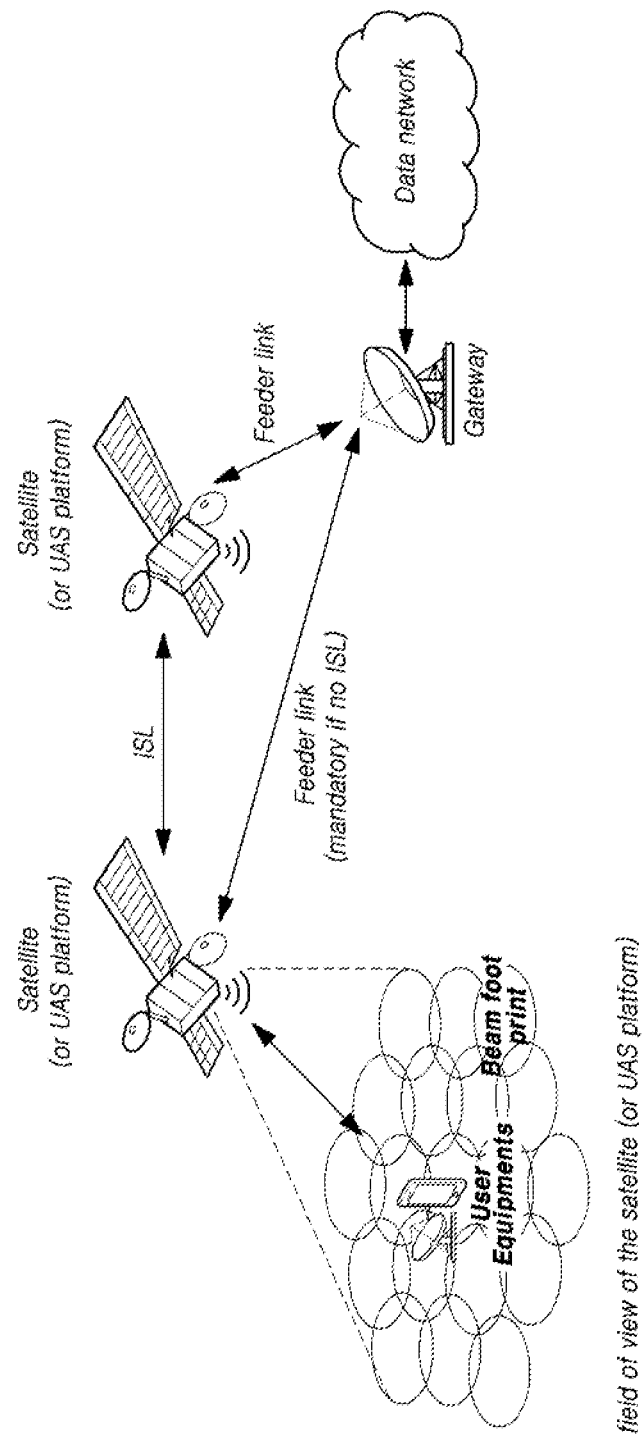
FIG. 9 exemplarily illustrates an NTN scenario.

FIG. 9 illustrates an NTN scenario.

Referring to FIG. 9, the non-terrestrial network (NTN) may be implemented in various ways as follows.

Scenario A: Transparent GEO (NTN beam foot print fixed on earth)

Scenario B: Regenerative GEO (NTN beam foot print fixed on earth)

Scenario C1: Transparent LEO (NTN beam foot print fixed on earth)

Scenario C2: Transparent LEO (NTN beam foot print moving on earth)

Scenario D1: Regenerative LEO (NTN beam foot print fixed on earth)

Scenario D2: Regenerative LEO (NTN beam foot print moving on earth)

Here, a transparent payload or a regenerative payload is defined as follows.

A transparent payload: Radio Frequency filtering, Frequency conversion and amplification. Hence, the waveform signal repeated by the payload is un-changed;

A regenerative payload: Radio Frequency filtering, Frequency conversion and amplification as well as demodulation/decoding, switch and/or routing, coding/modulation. This is effectively equivalent to having all or part of base station functions (e.g. gNB) on board the satellite (or UAS platform).

As shown in FIG. 9, the satellite (or UAS platform) generate beams, typically generate several beams over a given service area bounded by its field of view. The footprint of the beam is typically elliptical.

FIG. 10 is a table showing the types of NTN platform.

Referring to FIG. 10, the table shows a typical beam footprint size for each type of NTN platform. For example, the LEO satellite has a beam size in the range of 100-500 km, and each satellite and UAS platform may have a different beam size according to the range and orbit of the operating altitude.

Meanwhile, as in scenarios C2 and D2, when the NTN beam footprint moves on the earth, that is, when the satellite beam moves together with the satellite, it may be assumed that the linkage between the cell and the base station does not change. For example, when a satellite beam transmitted through a corresponding satellite is configured in a one-to-one connection with one PCI (Physical Cell Identifier), a cell having the corresponding PCI moves on the earth as time elapses.

For convenience of description, a beam generated from a satellite platform in the NTN is referred to as a satellite beam, hereinafter. This is for convenience of description. The beam may be replaced by any other term. The beam means communication coverage of a specific radius generated by a network node such as the base station of a non-terrestrial network for communication.

On the other hand, an earth fixed beam used in other scenarios means that a satellite steers a beam to a fixed point on the earth using a beamforming technique during the satellite's visibility time. As such, in the case of a steerable beam, even if the satellite moves, the footprint of the satellite beam may be fixed on the earth for a predetermined time.

When implementing an NTN scenario based on the NR technology, in order to efficiently provide the NTN by reusing the NR standard as much as possible, any Satellite beams, satellites or satellite cells are not considered to be visible from UE perspective as distinct from the general NR cell. For example, from UE perspective, only the standardized PCI (Physical Cell ID), SSB, and CSI-RS may be visible in the NR. In addition, it may be assumed that the UE provides beam-based mobility. Through this, the UE may indicate a new SSB or CSI-RS to the base station when the beam failure is detected on the serving SSB/CSI-RS. However, the non-terrestrial network may be accompanied by a large delay in performing the beam failure recovery procedure due to a large propagation delay between the base station and the UE. Accordingly, if the typical beam failure procedure is used as it is, it would be inefficient to perform operations in the beam failure recovery process. That is, when the non-terrestrial network is constructed based on the NR technology, the delay increases in the beam failure recovery process. Due to such delay, it is very difficult to rapidly or effectively detect or consider the changes in the radio environment.

In order to solve such problems, the present disclosure introduces a method and apparatus for efficiently providing beam failure recovery of a UE in the non-terrestrial network.

There is no explicit definition of one cell in the typical NR standard. However, the physical cell identifier (PCI) is used in the NR standard. Within the frequency span of a carrier, multiple SSBs may be transmitted. The PCIs of those SSBs do not have to be unique, e.g., different SSBs can have different PCIs. However, when an SSB is associated with an RMSI, the SSB corresponds to an individual cell, which has a unique NCGI (NR cell global identifier). Such an SSB is referred to as a Cell-Defining SSB (CD-SSB). A PCell is always associated to a CD-SSB located on the synchronization raster. In view of the UE, a serving cell is associated with at most one single SSB. In the typical NR standard, the SSB is serviced by a physical beam through which NR-PSS, NR-SSS, and NR-PBCH are transmitted, and a plurality of SSBs in one cell share the same PCI. The SSB was transmitted in the TDM scheme by the beam sweeping.

One satellite beam is one beam generated from one satellite platform, and one earth footprint or radio coverage is formed by one satellite beam. For example, the corresponding radio coverage may be an area capable of receiving a signal having a value as large as a certain threshold value in the largest signal of the beam. In order to efficiently provide the NTN by recycling the NR standard as much as possible, it is assumed that the UE does not consider the ability to distinguish a satellite beam, a satellite, or a satellite cell that is distinguished from the NR cell.

Figure 11:
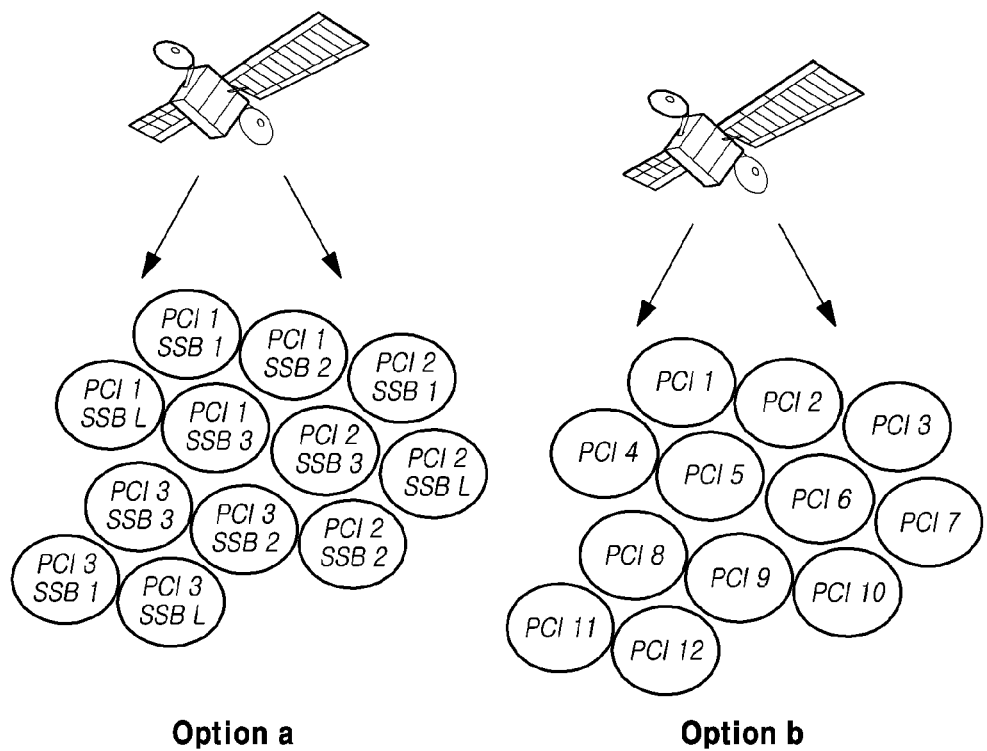
FIG. 11 illustrates a configuration of an NTN satellite beam.

FIG. 11 illustrates a configuration of an NTN satellite beam.

Referring to FIG. 11, an exemplary configuration of a satellite beam in the non-terrestrial network (NTN) constructed based on the NR will be described. First, as an option a, the same PCI may be configured for multiple (e.g. L) satellite beams. The association between the PCI and the SSB may be implemented in a similar way to NR. For example, one SSB may be provided per one PCI. Alternatively, a plurality of SSBs may be provided in one PCI. A plurality of SSBs may be provided in a TDM manner by one satellite beam. In this case, although the same cell identification information is provided, beam mobility may be provided by distinguishing satellite beams. Meanwhile, since the NTN has a large delay between the UE and the satellite, the effect may be limited when using the plurality of SSBs in the TDM method. Therefore, if the plurality of SSBs are provided for the same PCI, different satellite beams may be configured to have different SSBs by providing them in the FDM method. In this case, one or more information elements may be provided through different MIB information and different SIB1 in order to distinguish respective frequencies of satellite beams providing different SSBs for the same PCI. In this case, although the same cell identification information such as the PCI is provided, beam mobility may be provided by distinguishing the satellite beams. Alternatively, in the satellite beams providing the different SSBs for the same PCI, one or more information elements may have the same MIB information, but one or more information elements may be provided through different SIB1s.

NR SIB1 may include cell selection information for serving cell selection (cellSelectionInfo), cell access related information including PLMN ID (CellAccessRelatedInfo), information for connection establishment failure control (ConnEstFailureControl), scheduling information for system information (si-SchedulingInfo), common configuration information of the serving cell (servingCellConfigCommon), integrated access barring information (uac-BarringInfo), information for IMS emergency bearer service support (ims-Emergency Support), timer and constant value information to be used by the UE (ue-TimersAndConstants), etc. The common configuration information of the double serving cell includes the PCI, downlink common configuration information (downlinkConfigCommon), uplink common configuration information (uplinkConfigCommon), etc. The downlink common configuration information includes downlink frequency information (frequencyInfoDL) and initial downlink BWP (initialDownlink BWP) information, and uplink common configuration information includes uplink frequency information (frequencyInfoUL) and initial uplink BWP (initialuplink BWP) information. The satellite beams providing the different SSBs for the same PCI have the same MIB information, but the satellite beams may provide individual SIB information elements (e.g. downlink frequency information, uplink frequency information) for satellite beams providing each SSB.

Alternatively, the satellite beams providing the different SSBs for the same PCI may be provided through the same MIB and the same SIB1 with one or more information elements. Alternatively, the satellite beams providing the different SSBs for the same PCI may provide the same SIB1 although one or more information elements have different MIB information.

The satellite beam may be configured to have one PCI per one satellite beam, for example as an option b. Because NTN's coverage is large compared to that of high-frequency based terrestrial NR, it is not necessary to provide the multiple SSBs for the same PCI. Accordingly, one satellite beam may be configured as one cell. Through this, different satellite beams may be configured to have different PCI (or NGCI). The association between the PCI and the SSB can be implemented in a similar way to the NR. For example, one SSB may be provided per one PCI. Alternatively, the plurality of SSBs may be provided in one PCI. The plurality of SSBs may be provided in a TDM manner by one satellite beam. In the above description, an example of linking one PCI to one or a plurality of SSBs has been described, but this is only for convenience of description, and the present disclosure may be also applied to an arbitrary scenario in which one cell is divided into the plurality of satellite beams having the same PCI and transmitted.

As described above, in the non-terrestrial network, the large delay may occur in the beam failure recovery procedure due to the large propagation delay between the base station and the UE. If radio quality is improved in the beam failure recovery process, radio resources may be wasted unnecessarily for the beam failure recovery. On the other hand, if the satellite beam is changed during the beam failure recovery process, access may fail. This may cause another interruption due to radio link failure. The present disclosure provides methods, the UE, and the base station for effectively handling these cases. Hereinafter, such method, the UE, and the base station will be described.

The base station in the present specification may mean a public entity such as a satellite that transmits and receives information to the UE in an NTN environment. Alternatively, it may refer to a terrestrial entity that generates data transmitted/received through an aerial entity such as a satellite. That is, the base station in the present disclosure means an entity that transmits and receives data to and from the UE in the NTN environment. However, embodiments of the present disclosure are not limited thereto.

Figure 12:
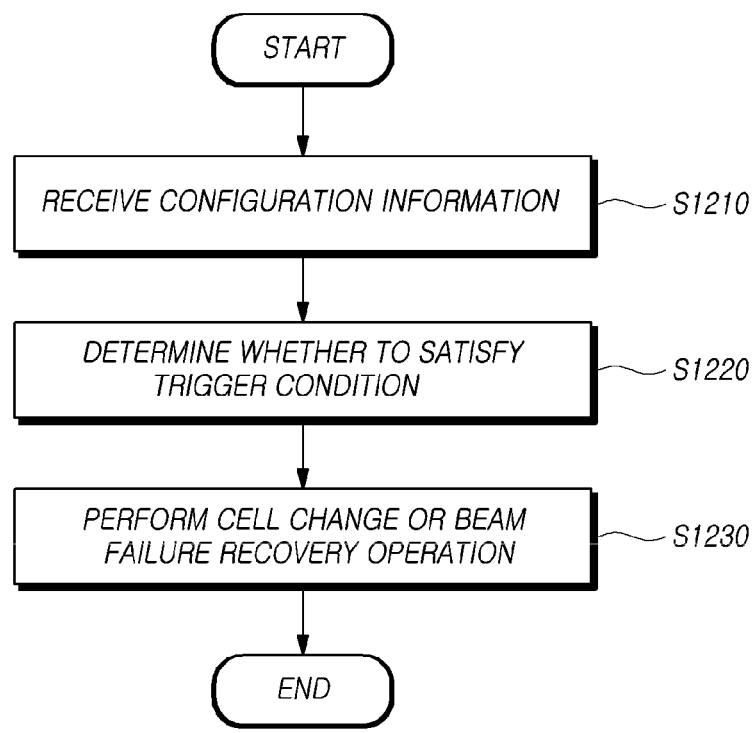
FIG. 12 is a flowchart for describing operations of a UE according to an embodiment.

FIG. 12 is a flowchart for describing operations of a UE according to an embodiment.

Referring to FIG. 12, a user equipment (UE) for performing communication using a non-terrestrial network may perform a step of receiving configuration information for a cell change or a beam failure recovery from a base station at S1210.

For example, the UE receives configuration information including an information element used when performing the cell change or the beam failure recovery from the base station. According to an embodiment, the configuration information may include period information for the cell change or a beam change. According to another embodiment, the configuration information may include a trigger condition for performing the cell change or the beam failure recovery. According to still another embodiment, the configuration information may include both the period information and the trigger condition described above.

Specifically, the configuration information may include duration information used by the UE to detect beam failure. Alternatively, the configuration information may include location information (e.g., coordinate information) and orbital movement information of the base station. Alternatively, the configuration information may include the coordinate information and the orbital movement information of a plurality of base stations (e.g., satellites). If necessary, the configuration information may include orbit information for each satellite beam and SSB or CSI-RS index information for linking it.

In addition, the configuration information may include information for performing the cell change or the beam failure recovery only at a specific time point or a specific area. For example, information for inactivating the cell change or the beam failure recovery operation may be included in the configuration information until the UE is at a specific location or reaches a specific time point. To this end, the configuration information may include a timer value, a counter value, and the like, and the configuration information may include or refer to beam failure recovery configuration information and radio link monitoring configuration information.

Since the configuration information may be different according to each embodiment, information transmitted by the base station to the UE in the following individual embodiment operations may be included in the configuration information.

The UE may perform a step of determining whether a trigger condition for the cell change or the beam failure recovery is satisfied using the configuration information at S1220.

For example, the trigger condition includes at least one of a timer value indicating an execution start time of the cell change or the beam failure recovery operation, duration information during which the cell change or the beam failure recovery operation is executed, and one or more measurement thresholds to which execution of the cell change or the beam failure recovery operation is applied.

As described above, the trigger condition may be included in the configuration information and configured in the UE. The UE may perform an operation for the cell change or the beam failure recovery for a predetermined duration from the execution start time of the cell change or the beam failure recovery operation, and the UE may deactivate the corresponding operation at other times. Alternatively, the UE may configure a plurality of measurement thresholds so that the cell change or the beam failure recovery operation is activated only at a specific time or at a specific UE location. Operation of the UE will be described in more detail through the operations of individual embodiments below.

The one or more measurement thresholds are indicated using at least one of event A2, event A3, and event A4.

For example, condition information for a measurement threshold may be configured through a combination of one or more of Event A2 indicating that the quality of the source cell is worse than the absolute threshold (Serving becomes worse than absolute threshold), or event A4 indicating that the quality of the target cell is better than the absolute threshold (Neighbor becomes better than the absolute threshold) and event A3 for general handover (Neighbor becomes amount of offset better than PCell/PSCell).

The UE may perform a step of performing the cell change or the beam failure recovery operation when the trigger condition is satisfied at S1230.

If the above-described trigger condition is satisfied, the UE may monitor the satellite beam using the configuration information and perform the cell change operation according to the movement of the satellite or the UE. Similarly, when the trigger condition is satisfied, the UE performs a monitoring operation for detecting the beam failure. When the beam failure is detected, the UE performs an operation for the beam failure recovery.

For example, the cell change or the beam failover operation may include a random access operation. For example, when the cell change event is detected, the UE may perform a handover operation to the target cell. For handover, the UE performs the random access operation on the target cell. As another example, in order to perform the beam failure recovery operation, the UE restores or changes the beam by performing the random access operation on a beam other than the failed beam or a beam in which failure is detected.

As described above, in the present disclosure, the base station configures (e.g., defines) a predetermined condition such as a time or a location in advance, rather than performing the beam failure recovery operation using a general terrestrial base station, and initiates the cell change or the failure recovery operation only in a situation where the condition is satisfied, it is possible to solve the problem caused by the longer time delay between the UE and the base station.

Figure 13:
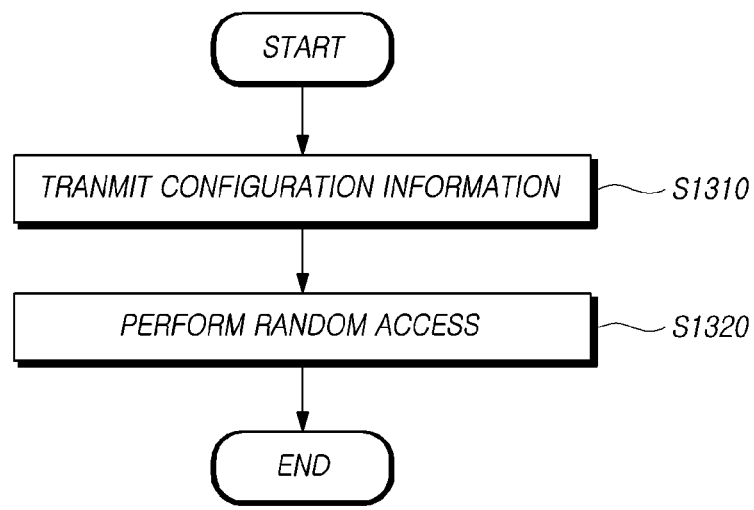
FIG. 13 is a flowchart for describing operations of a base station according to an embodiment.

FIG. 13 is a flowchart for describing operations of a base station according to an embodiment.

Referring to FIG. 13, a base station performing communication using a non-terrestrial network with a user equipment (UE) may perform a step of transmitting configuration information for a cell change or a beam failure recovery to a user equipment (UE) at S1310.

According to an embodiment, the configuration information may include period information for the cell change or a beam change. According to another embodiment, the configuration information may include a trigger condition for performing the cell change or the beam failure recovery. According to another embodiment, the configuration information may include both the period information and the trigger condition described above.

Specifically, the configuration information may include duration information used by the UE to detect beam failure. Alternatively, the configuration information may include location information (e.g., coordinate information) and orbital movement information of the base station. Alternatively, the configuration information may include the coordinate information and the orbital movement information of a plurality of base stations (e.g., satellites). If necessary, the configuration information may include orbit information for each satellite beam and SSB or CSI-RS index information for linking it.

In addition, the configuration information may include information for performing the cell change or the beam failure recovery only at a specific time point or a specific area. For example, information for inactivating the cell change or the beam failure recovery operation may be included in the configuration information until the UE is at a specific location or reaches a specific time point. To this end, the configuration information may include a timer value, a counter value, and the like, and the configuration information may include or refer to beam failure recovery configuration information and radio link monitoring configuration information.

Since the configuration information may be different according to each embodiment, information transmitted by the base station to the UE in the following individual embodiment operations may be included in the configuration information.

The base station may perform a step of performing a random access operation determining when a trigger condition for the cell change or the beam failure recovery is satisfied at S1320.

The UE may determine whether a trigger condition for the cell change or the beam failure recovery is satisfied using the configuration information.

For example, the trigger condition includes at least one of a timer value indicating an execution start time of the cell change or the beam failure recovery operation, duration information during which the cell change or the beam failure recovery operation is executed, and one or more measurement thresholds to which execution of the cell change or the beam failure recovery operation is applied.

As described above, the trigger condition may be included in the configuration information and configured in the UE. The UE may perform an operation for the cell change or the beam failure recovery for a predetermined duration from the execution start time of the cell change or the beam failure recovery operation, and the UE may deactivate the corresponding operation at other times. Alternatively, the UE may configure (e.g., define or set) a plurality of measurement thresholds so that the cell change or the beam failure recovery operation is activated only at a specific time or at a specific UE location. Operation of the UE will be described in more detail through the operations of individual embodiments below.

The one or more measurement thresholds are indicated using at least one of event A2, event A3, and event A4.

For example, condition information for a measurement threshold may be configured through a combination of one or more of Event A2 indicating that the quality of the source cell is worse than the absolute threshold (Serving becomes worse than absolute threshold), or an event A4 indicating that the quality of the target cell is better than the absolute threshold (Neighbor becomes better than the absolute threshold) and an event A3 for general handover (Neighbor becomes amount of offset better than PCell/PSCell).

If the above-described trigger condition is satisfied, the UE may monitor the satellite beam using the configuration information and perform the cell change operation according to the movement of the satellite or the UE. Similarly, when the trigger condition is satisfied, the UE performs a monitoring operation for detecting the beam failure. When the beam failure is detected, performs an operation for the beam failure recovery.

According to the cell change operation or the beam failure recovery operation of the UE, the base station may perform a random access operation with the UE. Alternatively, the base station may perform a handover operation for performing a handover when the UE requests a handover to another base station.

As described above, the UE and the base station perform an operation for triggering the cell change operation or the beam failure recovery operation of the UE only under a specific situation.

Hereinafter, various operations that may be performed by the above-described UE and the above-described base station will be separately described in each embodiment. Each embodiment may be applied individually or in any combination.

1) Configuration of Duration for Detecting Beam Failure (e.g., Beam Failure Detection Duration) Considering Satellite Orbit Information In the above-described scenarios C2 and D2, a cell or a satellite beam provided by a satellite moves across the Earth. In another scenario using an earth fixed beam, one specific area is covered by a cell or a satellite beam provided by one satellite. According to the movement of the satellite, one specific area will be covered by another cell or another satellite beam provided by another satellite.

Accordingly, in this scenario, even if the RRC connected state UE does not move, the movement of the satellite may cause a beam change between the UE and the base station. When one satellite beam is configured as one cell, the beam change may mean the cell change. Hereinafter, even though it is denoted as the beam change for convenience of description, the beam change may be understood as meaning including the case of a cell change.

Since the movement speed of the LEO satellite is very fast at 7.56 km/sec, frequent satellite beam changes may be induced even if the UE does not move, and thus the beam failure may occur.

On the other hand, satellite orbit information such as ephemeris is publicly available. The satellite orbit information includes x, y, z coordinate information and velocity information in an earth-centered, earth-fixed coordinate system according to time. The time may be an epoch including year, month, day, hour, and second information. FIG. 14 is exemplarily illustrates satellite orbit information according to an embodiment. FIG. 15 is illustrates a parameter value of satellite orbit information according to an embodiment.

Referring to FIG. 14 and FIG. 15, satellite orbit information is information about orbital trajectories of the satellite, including a semi-major axis, an eccentricity, an inclination, and an ophthalmic axis such as right ascension of the ascending node, perigee such as argument of periapsis, mean anomaly at a reference point in time, and satellite orbit information reference time such as the epoch.

If the network (or UE) may utilize the satellite orbit information, it may help to reduce the overhead of measurement and measurement report for satellite/satellite beam/cell change. To this end, it is necessary to configure the satellite orbit information for each satellite beam/cell. Each satellite beam may be associated with an identifier for identifying the corresponding satellite beam. For example, the satellite beam may be associated with an SSB index. Alternatively, the satellite beam may be associated with a CSI-RS index.

The base station may provide information on the satellite beam according to time that covers the current location of a specific UE (or the geographic area/region/zone in which the UE is currently located). To this end, the satellite orbit information for each satellite as shown in FIG. 14 or FIG. 15 may be used separately for each satellite beam/cell. The satellite beam/cell may be associated with the SSB index for each base station. Alternatively, the satellite beam/cell may be linked to the CSI-RS index for each base station. The gNB ID may be used for base station identification. For example, a specific satellite beam/cell may be identified through a combination of the base station identifier and the SSB-index.

The orbit information for each satellite beam/cell transmitted by the base station may be pre-configured and stored. Alternatively, the corresponding information is pre-configured and stored through another network entity/node/application server or OAM, and the base station may inquire and receive it. For example, one base station may receive the orbit information for each satellite beam/cell transmitted by the base station from another/neighboring base station.

The satellite beam/cell information according to time (timely) for each location/geographical area/region/zone serviced by an arbitrary satellite beam transmitted by the corresponding base station may be pre-configured and stored. Alternatively, the corresponding information is pre-configured and stored through another network entity/node/application server or OAM, and the UE or the base station may inquire and receive it.

The orbit information for all satellites/satellite beams/cells that will service the UE may be stored/provisioned/configured in advance in the UE (e.g. USIM). The orbit information for each satellite may be distinguished by being assigned an ID/index for identifying it. The base station may broadcast the corresponding satellite ID/identifier information through the system information. Through this, the UE may extract detailed orbit information of the corresponding satellite from the orbit information stored in the UE (e.g. USIM), and thus may derive the location information (e.g. coordinate information) of the serving satellite. Alternatively, the UE may derive the location information of the base station from any orbit information indicated by the base station through the system information. The trajectory information indicated by the base station through the system information may be any information in FIG. 14 or FIG. 15 or information processed in an arbitrary form.

The base station may request and receive the current location information of the UE from the UE. The base station may estimate the location of the UE based on the information received from the UE. The base station may request and receive assistance information for estimating the location of the UE from the UE. For example, information useful for estimating the location of the UE, such as the speed, the moving direction, the moving route, the destination, and the arrival time of the destination, may be obtained from the UE. An aircraft UE such as an airplane may have movement route information for each time zone according to a flight schedule. The base station may designate the format of information required to estimate the location information of the UE and request it to the UE. For example, information on the arrival time to the distance to the edge/boundary/center included in the coverage of the neighboring satellite/satellite beam may be requested. As another example, it is possible to request information about the moving direction and the speed of the UE.

If the UE has the capability to calculate/determine the location (e.g. using GNSS), the UE may report the location information of the UE to the base station by the request/indication of the base station. If the UE cannot calculate/determine its location, the region where the UE is located may be distinguished by the UE's current beam ID, cell ID, TAC unit, and the like. The network may know the current satellite beam, cell, and TA of the connected UE. The base station may determine the next candidate satellite beam/cell for a specific UE by using the received information and satellite orbit information. Alternatively, the base station may know the next candidate satellite beam/cell information at the current location of a specific UE in consideration of the satellite beam change period/interval in an arbitrary location/geographical area/region/zone. For example, if the satellite beam change period/interval is 5 minutes and the current location is estimated to have passed 2 minutes after the beam change, it may be estimated that it will be serviced by satellite beam #2 after 3 minutes, by satellite beam #3 after 8 minutes, and satellite beam #4 after 13 minutes.

On the other hand, as described above, the non-terrestrial network may be accompanied by the large delay in performing the beam failure recovery procedure due to the large propagation delay between the base station and the UE. Therefore, when the UE is within an area expected to be serviced by a specific satellite beam, for example, when the UE is near the edge of the corresponding satellite beam coverage rather than near the center of the corresponding satellite beam coverage, it may be more likely to experience the beam change or the beam failure. Therefore, it may be desirable for the base station to indicate the UE to trigger/execute the beam change in the vicinity of the edge/boundary of the satellite beam coverage, or to detect and recover the beam failure. In order to indicate this, the base station may configure the beam change or the beam failure detection duration to the UE. For convenience of explanation, the following is a monitoring location range/area/zone/duration/valid time/time range/execution time/trigger satisfaction time (timer to trigger) for execution of cell/satellite beam change or beam failure detection/recovery, cell/satellite beam change or beam failure detection/recovery expected duration/effective time/time range/execution time/timer to trigger or cell/satellite beam change or beam failure detection/recovery, or the location range/area/zone/duration/valid time/time range/execution time/timer to trigger satisfying the criteria for execution of cell/satellite beam change or beam failure detection/recovery is indicated as the beam failure detection duration. This is only for convenience of description and may be replaced with any other terminology.

Figure 16:
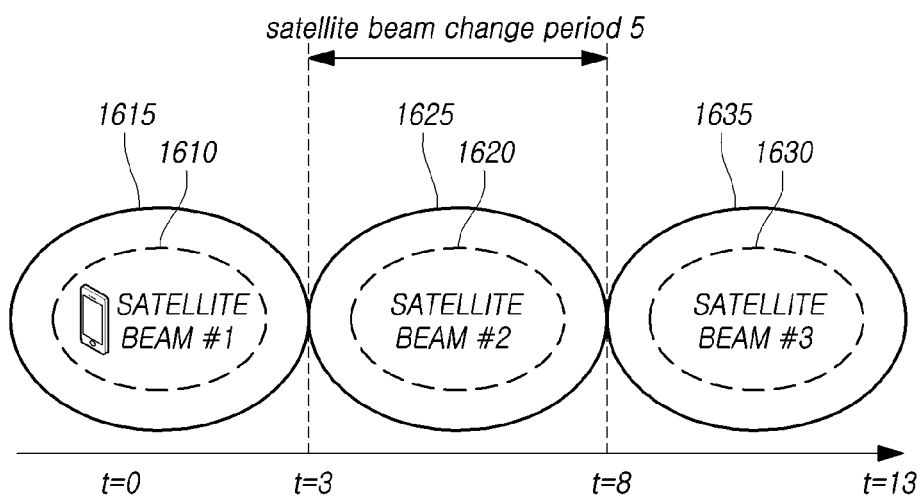
FIG. 16 illustrates beam failure detection duration according to beam change according to the present embodiment.

FIG. 16 exemplarily illustrates a duration for detecting beam failure caused by beam change in accordance with an embodiment.

Referring to FIG. 16, small circles 1610, 1620, and 1630 indicated by a dotted line in each satellite (e.g., satellite beam or cell) indicate the center portion of the corresponding satellite beam/cell coverages 1615, 1625, 1635 indicated by a solid line. When the UE is in the center portions 1610, 1620, and 1630, the UE may not expect to change the beam or to detect and recover the beam failure. On the other hand, if the UE is out of the center of each satellite beam/cell coverage, for example, out of the small circles 1610, 1620, and 1630 indicated by dotted lines, the UE may expect to change the beam or to detect and recover the beam failure. This embodiment may be applied to a satellite beam moving scenario such as the earth moving beam footprint. In addition, this embodiment may be applied to all satellite beam fixed scenarios such as the earth fixed beam. Since the satellite/satellite beam is changed over time in a specific location/location area/zone in both scenarios, the embodiments in the present disclosure may be applied regardless of the scenario. For example, in FIG. 16, when the UE establishes or sets up the RRC connection through the satellite beam #1 and transitions to the connected state at t=0, the UE does not expect to change the beam or to detect and recover the beam failure until t=2. The UE expects to change the beam or detect/recover the beam failure for a duration from t=2 to t=4. That is, through duration information for the beam change or the beam failure recovery, the UE may be configured to perform an operation for the beam change or the beam failure recovery only in a specific time region or at a specific location.

2) Configuration of Beam Failure Detection and Recovery Parameters

When the UE is in the center portion of the satellite beam, which is an area where the beam change, the beam failure detection and recovery is not expected, or when the UE is in a duration in which the beam change, the beam failure detection and recovery is not expected, it may be inefficient for the UE to perform the beam change or the beam failure detection and recovery procedures.

For example, the base station may indicate to disable the beam failure detection and recovery procedure. According to an embodiment, the base station may define an information element for indicating to disable the beam failure detection and recovery procedure and indicate it to the UE. According to another embodiment, when the beam failure detection duration is configured, if the beam failure detection duration does not operate, the timer according to the corresponding indication information does not start or the corresponding duration does not reach, the base station do not perform the beam change or the beam failure detection and recovery procedure. According to still another embodiment, the base station defines a new value in one or more of the parameters included in the beam failure recovery configuration information (BeamFailureRecoveryConfig) and the radio link monitoring configuration information (RadioLinkMonitoringConfig) for beam failure detection and recovery and, even if the beam failure detection and recovery procedure is performed, the random access procedure may not be initiated. For example, a value for setting the beam failure detection timer to infinity may be defined, or a value for setting beamFailureInstanceMaxCount to infinity may be defined. Although only some parameters are described for convenience of description, any parameters included in the above-described beam failure recovery configuration information and radio link monitoring configuration information may also be included in the scope of the present embodiment.

According to further still another embodiment, when the UE is in the center portion of the satellite beam and when the UE is in the edge/boundary part of the satellite beam, when the base station has a duration in which the UE does not expect to change the beam or to detect/recover the beam failure or when the base station has a duration in which the UE expects to change the beam or to detect/recover the beam failure, the base station may configure the parameter sets for the beam failure detection and recovery procedure separately. As an example, the separately set parameter may be one or more parameters among the parameters included in the beam failure recovery configuration information and the radio link monitoring configuration information for the beam failure detection and recovery. For example, it will be mainly described when the UE is in the center of the satellite beam. This is for convenience of description, and may be equally applied even when the UE is in a duration in which the beam change or the beam failure detection/recovery is not expected. When the UE is in the center part of the satellite beam, when the first beamFailureInstanceMaxCount value is configured and the UE is at the edge/boundary of the satellite beam, or when the UE is in the expected duration for the beam change or the beam failure detection/recovery, the second beamFailureInstanceMaxCount value may be configured with a different value from the first beamFailureInstanceMaxCount value. Hereinafter, for convenience of explanation, 'when the UE is in the expected duration for the beam change or the beam failure detection/recovery' is denoted as 'when the UE is at the edge/boundary of the satellite beam. The first beamFailureInstanceMaxCount value may have a larger value than the second beamFailureInstanceMaxCount value. Alternatively, the first rsrp-ThresholdSSB value at the center portion of the satellite beam and the second rsrp-ThresholdSSB value at the edge/boundary portion of the satellite beam may be configured as different values. Although only some parameters are described for convenience of description, any parameters included in the above-described beam failure recovery configuration information and the radio link monitoring configuration information may also be included in the scope of the present embodiment.

For another example, when the satellite beam moves or when the satellite beam is changed in a specific area, the location of the UE may also be changed. Accordingly, the start time and/or the end time of the beam failure duration may be changed. This may vary depending on the mobility level of the UE. The base station may indicate, to the UE, an offset value for correcting the movement of the UE together when configuring the beam failure duration to the UE. When the corresponding information is configured, the UE calculates a value calculated (e.g. addition, subtraction, scaling) using the corresponding value, and may operate the beam failure duration using this value.

For another example, the base station may indicate, to the UE, a scaling parameter for correcting the mobility of the UE when configuring the beam failure duration. When the corresponding information is configured, the UE may operate the timer using a value obtained by multiplying the scaling parameter by the beam failure duration.

For another example, the base station may indicate the UE to include satellite beam information in the mobility history report in order to calculate the above-described offset parameter or the scaling parameter. The mobility history report may include information on one or more of a base station identifier, an SSB index or a CSI-RS index, and a timestamp. The UE may report mobility information (e.g., mobility history report) in units of satellite beams to the base station. In the case of RRC connection establishment of an RRC idle UE or RRC connection resumption of an RRC inactive UE, the mobility information transmission in units of satellite beams may be performed at the request of the base station. Alternatively, the mobility information transmission in units of satellite beams may be performed at the request of the base station in the case of an RRC connected UE. Alternatively, when information indicating that the mobility history information is available is included in the RRC connection establishment or the RRC connection resumption process, the UE may transmit the mobility history information at the request of the base station.

For another example, when the UE receives configuration information including the beam failure duration, it may be applied. For example, if the start time of the beam failure duration is indicated to be 2 seconds later, the UE starts a timer set to the received value. When this timer expires after 2 seconds, the UE may initiate the beam change or the beam failure detection/recovery procedure. Alternatively, the operation according to each of the above-described embodiments may be performed. As another example, if the end time of the beam failure duration is indicated to be 3 seconds later, another timer set to a value of the beam failure duration (3 seconds−2 seconds=1 second) is started after the beam failure duration is started. If the beam failure is detected before this other timer expires, for example, if the counter (BFI_COUNTER) for indicating the beam failure instance is greater than or equal to beamFailureInstanceMaxCount, the UE uses the parameter configured in the beam failure recovery configuration and initiates the random access procedure. When the corresponding timer expires (another one second passes), the UE may initiate the random access procedure. The UE may receive a parameter to be used when performing the beam change or the beam failure detection and recovery procedure or when starting the random access procedure from the base station. For example, the base station may indicate to the UE and configure one or more of the random access preamble index, the SSB index, and the ra-OccasionList. If the corresponding satellite beam is through a satellite (or base station) different from the serving satellite beam, the above-mentioned information may requested to and received from the satellite (or base station) providing the serving satellite beam and the other satellite (or base station) providing the corresponding satellite beam.

The above-described timer may be indicated using a value based on International Standard Time (e.g. Coordinated Universal Time). The UE may apply the indicated value based on the International Standard Time as a condition. For example, the base station may indicate the coordinated universal time corresponding to the SFN boundary after the PDSCH end boundary through which the corresponding RRC message is transmitted, and the base station may indicate the offset time from this to the start of the beam change or beam failure duration. As another example, the base station may indicate the start Coordinated Universal Time of the next beam change or beam failure duration. The UE may already know the Coordinated Universal Time through system information (e.g. SIB9). Therefore, the UE can utilize it. As another example, the base station may indicate the elapsed time (or offset time) until the start of the next beam change or beam failure duration.

Meanwhile, the base station may indicate, to the UE, a condition for the UE to enter a section in which the beam change or the beam failure detection and recovery is expected. As an example, a measurement threshold (e.g., RSRP threshold) for a corresponding satellite beam may be configured. The measurement threshold may be configured in connection with the measurement ID included in the measurement configuration information. For example, condition information for a measurement threshold may be configured through a combination of one or more of Event A2 indicating that the quality of the source cell is worse than the absolute threshold (Serving becomes worse than absolute threshold), or an event A4 indicating that the quality of the target cell is better than the absolute threshold (Neighbor becomes better than the absolute threshold) and an event A3 for general handover (Neighbor becomes amount of offset better than PCell/PSCell). Accordingly, condition information for the measurement threshold may be included in the reporting configuration (ReportConfigNR) information element. As another example, the UE may configure a beam failure instance indication counter threshold value received from a lower layer. When the corresponding condition is configured, the UE may initiate the beam change or the beam failure detection and recovery procedure when the corresponding condition is satisfied.

As another example, the base station may configure the location TA (Timing Advance) threshold for the corresponding satellite beam in the UE. The TA is used to adjust the uplink frame timing relative to the downlink frame. The TA is the value doubled by the propagation delay. When the UE is in the center of the satellite beam, the TA has the smallest value. When the UE is in the edge of the satellite beam, the TA has the largest value. The UE may acquire the TA using the following method. First, the UE may receive an initial TA value by the base station during the random access procedure. Alternatively, for the RRC connected state UE, the base station may transmit the TA through the MAC CE. The UE may refine the TA by using the location of the UE and the orbit information of the satellite based on the TA received by the base station. For example, when the UE knows the location of the UE, the distance between the UE and the satellite may be calculated from the location of the UE and the location of the satellite. Dividing the distance value by the speed of light gives the propagation delay. The UE may know whether the UE has entered a section expecting the cell change or the beam failure detection and recovery based on the TA value calculated based on the satellite orbit information and the location information of the UE and the TA threshold value indicated by the base station.

The above conditions may be used independently or in any combination of conditions. For example, when the aforementioned timer expires (or in an expired state), the beam change or the beam failure detection/recovery procedure may be initiated when the aforementioned measurement threshold is satisfied.

As described above, the present embodiments may efficiently perform the beam failure recovery of the UE serviced through the non-terrestrial network.

Hereinafter, hardware and software configuration of a UE and a base station capable of performing some or all of the operations of each of the above described embodiments will be described again with reference to FIGS. 1 to 16.

Figure 17:
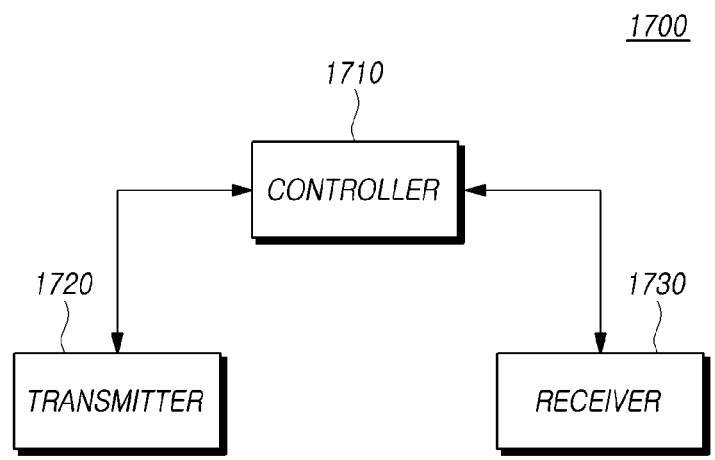
FIG. 17 is a block diagram illustrating a UE according to an embodiment.

FIG. 17 is a block diagram illustrating a UE according to an embodiment.

Referring to FIG. 17, a UE 1700 according to an embodiment performing communication using a non-terrestrial network may include a receiver 1730 configured to receive configuration information for a cell change or a beam failure recovery from a base station, and a controller 1710 configured to determine whether a trigger condition for the cell change or the beam failure recovery is satisfied using the configuration information, and perform the cell change or the beam failure recovery operation when the trigger condition is satisfied.

For example, the receiver 1730 receives configuration information including an information element used when performing the cell change or the beam failure recovery from the base station. According to an embodiment, the configuration information may include period information for the cell change or a beam change. According to another embodiment, the configuration information may include a trigger condition for performing the cell change or the beam failure recovery. According to still another embodiment, the configuration information may include both the period information and the trigger condition described above.

Specifically, the configuration information may include duration information used by the UE 1700 to detect beam failure. Alternatively, the configuration information may include location information (coordinate information) and orbital movement information of the base station. Alternatively, the configuration information may include the coordinate information and the orbital movement information of a plurality of base stations (satellites). If necessary, the configuration information may include orbit information for each satellite beam and SSB or CSI-RS index information for linking it.

In addition, the configuration information may include information for performing the cell change or the beam failure recovery only at a specific time point or a specific area. For example, information for inactivating the cell change or the beam failure recovery operation may be included in the configuration information until the UE 1700 is at a specific location or reaches a specific time point. To this end, the configuration information may include a timer value, a counter value, and the like, and the configuration information may include or refer to beam failure recovery configuration information and radio link monitoring configuration information.

On the other hand, the trigger condition includes at least one of a timer value indicating an execution start time of the cell change or the beam failure recovery operation, duration information during which the cell change or the beam failure recovery operation is executed, and one or more measurement thresholds to which execution of the cell change or the beam failure recovery operation is applied.

The trigger condition may be configured in the UE 1700 by being included in the configuration information, as described above. The controller 1710 perform an operation for the cell change or the beam failure recovery for a predetermined duration from the execution start time of the cell change or the beam failure recovery operation, and the controller 1710 may deactivate the corresponding operation at other times. Alternatively, the controller 1710 may configure a plurality of measurement thresholds so that the cell change or the beam failure recovery operation is activated only at a specific time or at a specific UE location. The one or more measurement thresholds are indicated using at least one of an event A2, an event A3, and an event A4.

For example, condition information for a measurement threshold may be configured through a combination of one or more of Event A2 indicating that the quality of the source cell is worse than the absolute threshold (Serving becomes worse than absolute threshold), or the event A4 indicating that the quality of the target cell is better than the absolute threshold (Neighbor becomes better than the absolute threshold) and the event A3 for general handover (Neighbor becomes amount of offset better than PCell/PSCell).

If the above-described trigger condition is satisfied, the controller 1710 may monitor the satellite beam using the configuration information and perform the cell change operation according to the movement of the satellite or the UE. Similarly, when the trigger condition is satisfied, the UE performs a monitoring operation for detecting the beam failure, and when the beam failure is detected, the UE performs an operation for the beam failure recovery. For example, the cell change or the beam failover operation may include a random access operation.

In addition to this, the controller 1710 controls the overall operation of the UE 1700 for controlling the cell change or the beam failure recovery operation in the non-terrestrial network required to perform the above-described embodiment.

The transmitter 1720 and the receiver 1730 are used to transmit or receive signals, messages, or data necessary for performing the above described embodiments, with the base station.

Figure 18:
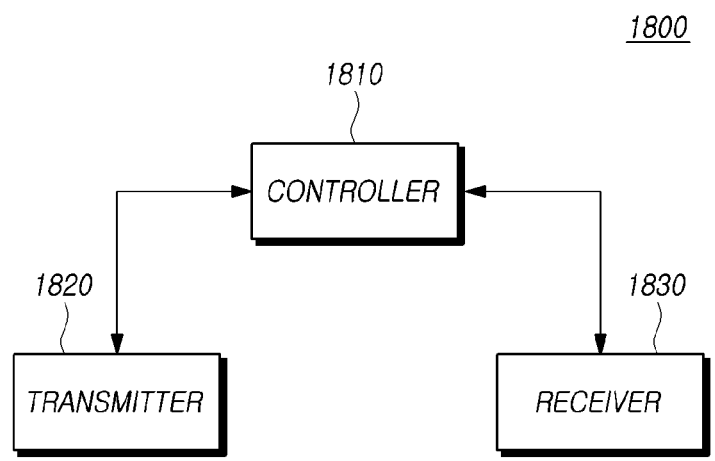
FIG. 18 is a block diagram illustrating a base station according to an embodiment.

FIG. 18 is a block diagram illustrating a base station according to an embodiment.

Referring to FIG. 18, a base station 1800 according to an embodiment performing communication using a non-terrestrial network with a user equipment (UE) may include a transmitter 1820 configured to transmit configuration information for the cell change or the beam failure recovery in the non-terrestrial network, and a controller 1810 configured to configured to perform a random access operation determining when a trigger condition for the cell change or the beam failure recovery is satisfied. The UE may determine whether a trigger condition for the cell change or the beam failure recovery is satisfied using the configuration information According to an embodiment, the configuration information may include period information for the cell change or a beam change. According to another embodiment, the configuration information may include a trigger condition for performing the cell change or the beam failure recovery. According to still another embodiment, the configuration information may include both the period information and the trigger condition described above.

Specifically, the configuration information may include duration information used by the UE to detect beam failure. Alternatively, the configuration information may include location information (coordinate information) and orbital movement information of the base station. Alternatively, the configuration information may include the coordinate information and the orbital movement information of a plurality of base stations (satellites). If necessary, the configuration information may include orbit information for each satellite beam and SSB or CSI-RS index information for linking it.

In addition, the configuration information may include information for performing the cell change or the beam failure recovery only at a specific time point or a specific area. For example, information for inactivating the cell change or the beam failure recovery operation may be included in the configuration information until the UE is at a specific location or reaches a specific time point. To this end, the configuration information may include a timer value, a counter value, and the like, and the configuration information may include or refer to beam failure recovery configuration information and radio link monitoring configuration information.

On the other hand, the trigger condition includes at least one of a timer value indicating an execution start time of the cell change or the beam failure recovery operation, duration information during which the cell change or the beam failure recovery operation is executed, and one or more measurement thresholds to which execution of the cell change or the beam failure recovery operation is applied.

As described above, the trigger condition may be included in the configuration information and configured in the UE. The UE may perform an operation for the cell change or the beam failure recovery for a predetermined duration from the execution start time of the cell change or the beam failure recovery operation, and may deactivate the corresponding operation at other times. Alternatively, the UE may configure a plurality of measurement thresholds so that the cell change or the beam failure recovery operation is activated only at a specific time or at a specific UE location. Specific embodiments and operation of the UE will be described in more detail through the operations of individual embodiments below. The one or more measurement thresholds are indicated using at least one of an event A2, an event A3, and an event A4.

If the above-described trigger condition is satisfied, the UE may monitor the satellite beam using the configuration information and perform the cell change operation according to the movement of the satellite or the UE. Similarly, when the trigger condition is satisfied, the UE performs a monitoring operation for detecting the beam failure, and when the beam failure is detected, the UE performs an operation for the beam failure recovery.

In addition to this, the controller 1810 controls the overall operation of the base station 1900 for controlling the cell change or the beam failure recovery operation in the non-terrestrial network required to perform the above-described embodiment.

The transmitter 1820 and the receiver 1830 are used to transmit or receive signals, messages, or data necessary for performing the above described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method for performing communication using a non-terrestrial network by a user equipment (UE), the method comprising:
receiving configuration information for a cell change or a beam failure recovery from a base station;
determining whether a trigger condition for the cell change or the beam failure recovery is satisfied using the configuration information; and
performing the cell change or the beam failure recovery when the trigger condition is satisfied,
wherein the trigger condition comprises i) a value indicating a start time of performing the cell change or the beam failure recovery, ii) time duration information on a duration of performing the cell change or the beam failure recovery, and iii) one or more measurement events that are applied to perform the cell change or the beam failure recovery,
wherein the value indicating the start time is indicated based on Coordinated Universal Time, and
wherein the determining whether the trigger condition is satisfied, determines that the trigger conditions are satisfied when all the trigger conditions configured by the configuration information are satisfied during a time duration configured by the configuration information.

2. The method of claim 1, wherein the configuration information comprises the trigger condition for executing the cell change or the beam failure recovery.

3. The method of claim 1, wherein the one or more measurement events comprises at least one of an event A3 and an event A4.

4. The method of claim 1, wherein the cell change or the beam failure recovery comprises a random access procedure for a handover to a target cell.

5. A method for performing communication using a non-terrestrial network by a base station, the method comprising:
transmitting configuration information for a cell change or a beam failure recovery to a user equipment (UE); and
performing a random access operation determining when a trigger condition for the cell change or the beam failure recovery is satisfied,
wherein the UE determines whether a trigger condition for the cell change or the beam failure recovery is satisfied using the configuration information,
wherein the trigger condition comprises i) a value indicating a start time of performing the cell change or the beam failure recovery, ii) time duration information on a duration of performing the cell change or the beam failure recovery, and iii) one or more measurement events that are applied to perform the cell change or the beam failure recovery,
wherein the value indicating the start time is indicated based on Coordinated Universal Time, and
wherein the UE determines that the trigger conditions are satisfied when all the trigger conditions configured by the configuration information are satisfied during a time duration configured by the configuration information.

6. The method of claim 5, wherein the configuration information comprises the trigger condition for executing the cell change or the beam failure recovery.

7. The method of claim 5, wherein the one or more measurement events comprises at least one of an event A3 and an event A4.

8. A user equipment (UE) performing communication using a non-terrestrial network, the UE comprising:
a receiver configured to receive configuration information for a cell change or a beam failure recovery from a base station; and
a controller configured to determine whether a trigger condition for the cell change or the beam failure recovery is satisfied using the configuration information, and perform the cell change or the beam failure recovery when the trigger condition is satisfied,
wherein the trigger condition comprises i) a value indicating a start time of performing the cell change or the beam failure recovery, ii) time duration information on a duration of performing the cell change or the beam failure recovery, and iii) one or more measurement events that are applied to perform the cell change or the beam failure recovery,
wherein the value indicating the start time is indicated based on Coordinated Universal Time, and
wherein the controller determines that the trigger conditions are satisfied when all the trigger conditions configured by the configuration information are satisfied during a time duration configured by the configuration information.

9. The UE of claim 8, wherein the configuration information comprises the trigger condition for executing the cell change or the beam failure recovery.

10. The UE of claim 8, wherein the one or more measurement events comprises at least one of an event A3 and an event A4.

11. The UE of claim 8, wherein the cell change or the beam failure recovery operation comprises a random access procedure for a handover to a target cell.

\* \* \* \* \*